United States Patent
Quesne et al.

(10) Patent No.: US 7,184,096 B2
(45) Date of Patent: Feb. 27, 2007

(54) METHOD AND CIRCUIT FOR PROVIDING A HORIZONTAL SCAN SIGNAL FOR A TELEVISION SET

(75) Inventors: Nicolas Quesne, Eybens (FR); Jean-Marc Merval, Veurey-Voroize (FR)

(73) Assignee: STMicroelectronics S.A., Montrouge (FR)

(*) Notice: Subject to any disclaimer, the term of this patent is extended or adjusted under 35 U.S.C. 154(b) by 486 days.

(21) Appl. No.: 10/626,064

(22) Filed: Jul. 24, 2003

(65) Prior Publication Data

US 2005/0275754 A1 Dec. 15, 2005

(30) Foreign Application Priority Data

Jul. 31, 2002 (FR) .................................. 02 09770

(51) Int. Cl.
*H03L 7/00* (2006.01)
(52) U.S. Cl. ..................... 348/540; 348/531
(58) Field of Classification Search ........ 348/529–531, 348/536, 537, 540, 541, 542, 543
See application file for complete search history.

(56) References Cited

U.S. PATENT DOCUMENTS

| | | | |
|---|---|---|---|
| 4,709,268 A * | 11/1987 | Akimoto et al. | 348/545 |
| 5,189,515 A * | 2/1993 | Chen | 348/535 |
| 5,319,706 A | 6/1994 | Mizukata et al. | |
| 6,211,920 B1 * | 4/2001 | Cirot et al. | 348/533 |

OTHER PUBLICATIONS

French Search Report from French Patent Application 02/09770, filed Jul. 31, 2002.

* cited by examiner

*Primary Examiner*—Michael H. Lee
(74) *Attorney, Agent, or Firm*—Lisa K. Jorgenson; James H. Morris; Wolf, Greenfield & Sacks, P.C.

(57) ABSTRACT

A method for providing a horizontal scan control signal for a TV set from a horizontal synchronization signal contained in a composite video signal, the horizontal synchronization signal containing horizontal synchronization pulses and parasitic pulses, the scan control signal being provided from an oscillating signal generated by an oscillator of a phase-locked loop receiving the horizontal synchronization signal, the oscillating signal having a frequency depending on a driving signal provided from the comparison between the horizontal synchronization signal and a binary phase signal, in which, at each parasitic pulse among successive parasitic pulses between two synchronization pulses, the driving signal is successively varied in the increasing direction or in the decreasing direction.

20 Claims, 3 Drawing Sheets

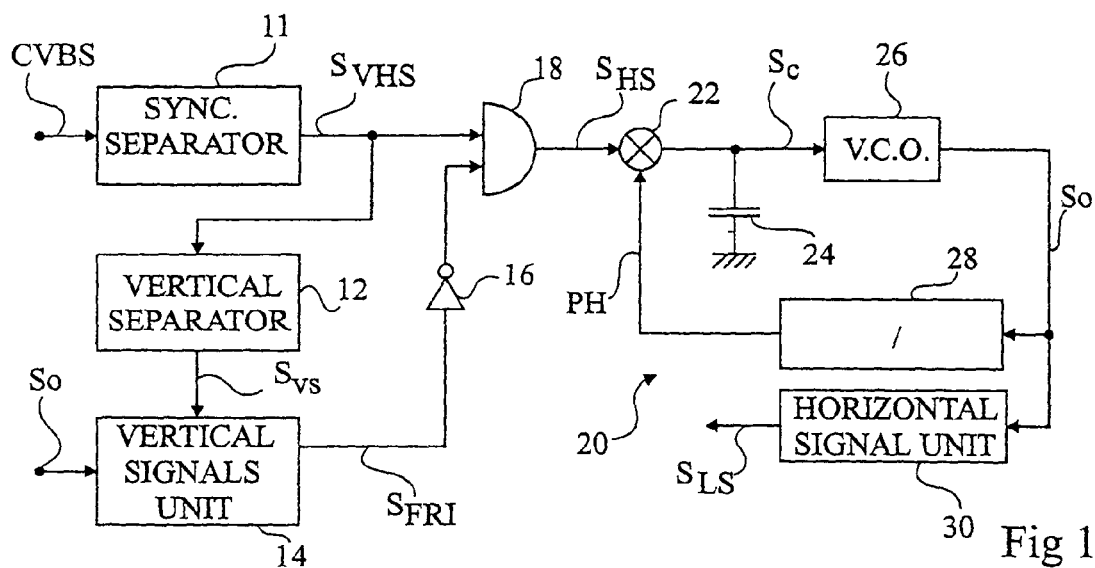
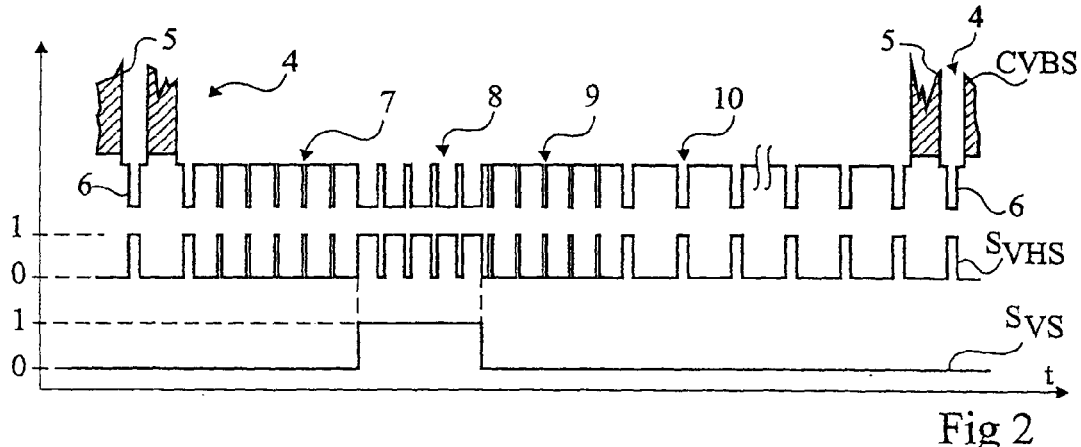
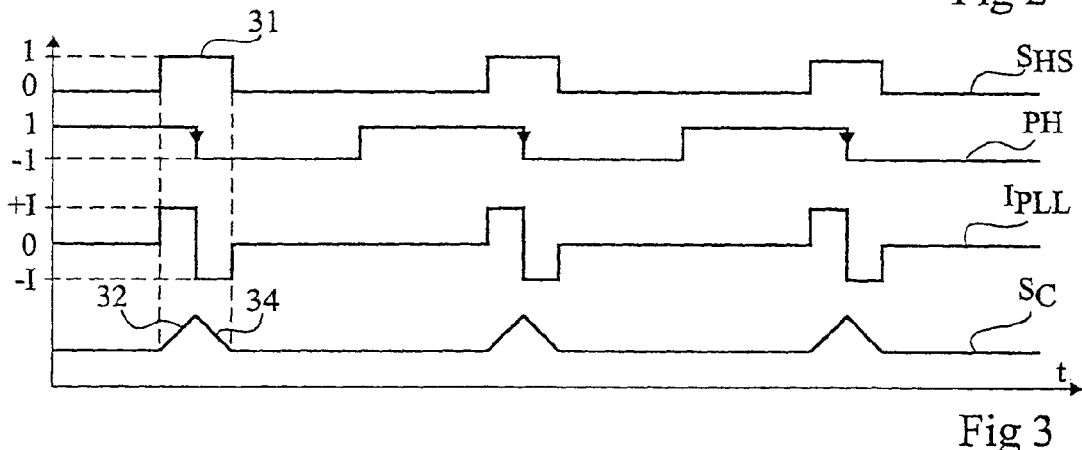
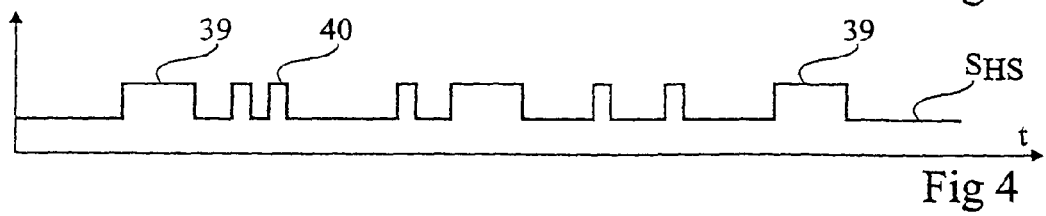

METHOD AND CIRCUIT FOR PROVIDING A HORIZONTAL SCAN SIGNAL FOR A TELEVISION SET

BACKGROUND OF THE INVENTION

1. Field of the Invention

The present invention relates to a method and a circuit for providing a horizontal scan or line scan control signal of a TV set.

2. Discussion of the Related Art

FIG. 1 schematically shows the general architecture of a circuit for providing signals for controlling the vertical and horizontal scanning of a TV set.

FIGS. 2 and 3 show signals characteristic of the circuit of FIG. 1.

Generally, and neglecting carrier frequencies, a TV set receives a composite video signal CVBS which comprises a frame signal 4 comprised of video signals 5, each corresponding to the information to be displayed on a line of the TV screen, separated by horizontal synchronization (or line synchronization) pulses 6. Between two frame signals 4, composite video signal CVBS comprises an area only containing synchronization signals which divide into so-called frame pre-synchronization signals 7, so-called frame synchronization signals 8, so-called frame post-synchronization signals 9, and so-called horizontal synchronization setting signals 10.

Composite video signal CVBS is provided to a separation unit 11 (SYNC. SEPARATOR) which provides a horizontal and vertical synchronization signal $S_{VHS}$. Unless otherwise mentioned, the signals considered hereafter will be substantially binary signals having a high state and a reference state, respectively designated as 1 and 0 hereafter. Some specific binary signals may vary between a low state, designated as −1, and the high state. Signal $S_{VHS}$ substantially corresponds to inverted composite video signal CVBS without video signals 5. Signal $S_{VHS}$ ensures the vertical and horizontal synchronization of the TV screen scanning. Signal $S_{VHS}$ is transmitted to a vertical synchronization separation unit 12 (VERTICAL SEPARATOR) which provides a vertical synchronization signal $S_{VS}$ equal to 1 over the entire duration of frame synchronization signals 8 of the CVBS signal and equal to 0 otherwise. Signal $S_{VS}$ is transmitted to a signal provision unit 14 (VERTICAL SIGNALS UNIT) adapted to generating, from $S_{VS}$, a vertical screen scan control signal and a horizontal synchronization inhibition signal $S_{FRI}$ transmitted to the input of an inverter 16 having its output connected to an input of a logic AND gate 18. Signal $S_{FRI}$ is at 1 over the entire duration of frame synchronization signals 8 and of frame post-synchronization signals 9, and at 0 otherwise. The other input of logic gate 18 receives synchronization signal $S_{VHS}$. Logic gate 18 provides a horizontal synchronization signal $S_{HS}$ transmitted to a phase-locked loop 20 and equal to 0 when $S_{FRI}$ is at 0 and equal to signal $S_{VHS}$ otherwise. Signal $S_{FRI}$ is used to deactivate loop 20 during the return of the vertical screen scanning before the beginning of the display of a new frame.

Phase-locked loop 20 comprises a phase comparator 22 receiving as an input horizontal synchronization signal $S_{HS}$ and a signal PH with a ½ duty cycle. Phase comparator 22 compares signals $S_{HS}$ and PH and provides a loop current $I_{PLL}$ to a capacitor 24. Voltage $S_C$ across capacitor 24 is applied to the input of a voltage-controlled oscillator 26 (VCO). Voltage-controlled oscillator 26 generates a periodic oscillation signal $S_O$ with a ½ duty cycle equal to 1 or −1, the frequency of which depends on control signal $S_C$. Signal $S_O$ is provided to a frequency divider 28 (/) and to a signal provision unit 30 (HORIZONTAL SIGNALS UNIT). Frequency divider 28 provides signal PH which is equal in frequency to signal $S_{HS}$ when phase-locked loop 20 is locked. Signal generator 30 especially generates signals $S_{HS}$ for controlling the horizontal screen scanning.

In FIG. 3, horizontal synchronization signal $S_{HS}$ is represented at an enlarged scale with respect to FIG. 2. The phase comparator compares signals PH and $S_{HS}$ to provide current $I_{PLL}$ equal to a value +I when signals PH and $S_{HS}$ are both at 1, to a value −I when signal $S_{HS}$ is at 1 and signal PH is at −1, and equal to 0 when signal $S_{HS}$ is at 0. In normal operation, the frequencies of signals $S_{HS}$ and PH are identical and the falling edges of PH occur in the middle of the synchronization pulses of $S_{HS}$. Current $I_{PLL}$ successively switches from 0 to +I when signal PH is at 1 and signal $S_{HS}$ switches from 0 to 1, to −I when signal $S_{HS}$ is at 1 and signal PH switches to −1, then again to 0 when signal $S_{HS}$ switches to 0. When current $I_{PLL}$ is at +I or at −I, voltage $S_C$ across capacitor 24 respectively corresponds to an ascending ramp 32 or a descending ramp 34. When current $I_{PLL}$ switches from −I to 0, voltage $S_C$ keeps the value acquired at the end of descending ramp 34.

In normal operation, ascending ramp 32 and descending ramp 34 of control signal $S_C$ are symmetrical. Control signal $S_C$ then keeps a substantially constant value before and after a pulse of horizontal synchronization signal $S_{HS}$. The frequency of oscillating signal $S_O$ thus is substantially constant. When the frequency or the phase of signal $S_{HS}$ varies, ramps 32, 34 are no longer symmetrical so that the average value of signal $S_C$ varies to adapt the frequency and the phase of signal PH.

Currently, to prevent the copying of the composite video signal, for example, on a video tape, parasitic pulses are added between two pulses of the horizontal synchronization signal on a portion of composite video signal CVBS. Generally, parasitic pulses are only added at the level of the signal for setting the horizontal synchronization 10, that is, for example, from the fifth to the twenty-first line, before the beginning of a frame signal.

FIG. 4 shows an example of a possible shape of horizontal synchronization signal $S_{HS}$ comprising horizontal synchronization pulses 39 and parasitic pulses 40. The number, the position, and the width of parasitic pulses 40 between two synchronization pulses 39 may be variable.

Parasitic pulses 40 tend to disturb the operation of phase-locked loop 20 by varying the frequency of oscillating signal $S_O$ from which the signals controlling horizontal screen scanning signals $S_{LS}$ are generated.

When parasitic pulses 40 are no longer present, phase-locked loop 20 tends to recover the frequency and the phase of horizontal synchronization pulses 39. However, due to the time constant of loop 20, the recovery may extend over several lines. The first video signals 5 displayed on the screen may then be offset with respect to the vertical left-hand edge of the screen.

To solve such a disadvantage, there is a tendency to temporarily increasing the time constant of the phase locked-loop as long as parasitic pulses 40 are present, to limit the frequency variations of signal So, then to return to a normal time constant when parasitic pulses 40 are no longer present. However, in this case also, the phase-locked loop may not recover sufficiently fast the frequency and phase of horizontal synchronization pulses 39. The first lines displayed on screen may then be shifted with respect to the vertical left-hand edge of the screen.

SUMMARY OF THE INVENTION

The present invention aims at a method and a circuit for providing a horizontal scanning synchronization signal for a TV set, which are less sensitive to parasitic pulses.

To achieve this and other objects, the present invention provides a method for providing a horizontal scan control signal for a TV set from a horizontal synchronization signal contained in a composite video signal, the horizontal synchronization signal containing horizontal synchronization pulses and parasitic pulses, said scan control signal being provided from an oscillating signal generated by an oscillator of a phase-locked loop receiving the horizontal synchronization signal, said oscillating signal having a frequency depending on a driving signal provided from the comparison of the horizontal synchronization signal and of a binary phase signal, in which, at each parasitic pulse among successive parasitic pulses between two synchronization pulses, the driving signal is successively varied in the increasing direction or in the decreasing direction.

According to an embodiment of the present invention, the parasitic pulses have variable durations.

The present invention also provides a circuit for providing a horizontal scan control signal for a TV set from a horizontal synchronization signal contained in a composite video signal, the horizontal synchronization signal containing horizontal synchronization pulses and parasitic pulses, said circuit comprising a phase-locked loop receiving the horizontal synchronization signal comprising an oscillator generating an oscillating signal from which is provided the scan control signal, the frequency of the oscillating circuit depending on a driving signal provided from the horizontal synchronization signal, and further comprising a means for correcting the driving signal which, at each parasitic pulse among successive parasitic pulses between two synchronization pulses, alternately varies the driving signal in the increasing or decreasing direction.

According to an embodiment of the present invention, the circuit further comprises a comparator for comparing the horizontal synchronization signal and a modified phase signal and providing, according to the comparison, a current of zero amplitude or of constant amplitude and of variable sign; a capacitor conducting the current and providing the driving signal; and a correction circuit providing the comparator with the modified phase signal corresponding to a binary phase signal having a frequency proportional to the frequency of the oscillating signal or corresponding to a binary correction signal, the state of which switches for each parasitic pulse.

According to an embodiment of the present invention, the correction circuit comprises a switch adapted to alternately connecting, according to a switch control signal, an output terminal connected to the comparator at a first input terminal receiving the phase signal or at a second input terminal receiving the correction signal, the switch signal being provided from a binary signal at a first state at the level of a synchronization pulse and at a second state otherwise.

According to an embodiment of the present invention, the switch signal is also provided from at least one binary validation signal at a first state when a validation condition is fulfilled and at a second state when the validation condition is not fulfilled.

According to an embodiment of the present invention, the circuit comprises a latch providing the correction signal receiving a binary latch control signal provided from the horizontal synchronization signal, the state of the correction signal switching at each falling edge of the latch control signal.

According to an embodiment of the present invention, the circuit comprises a filter receiving the horizontal synchronization signal and providing the latch control signal, the latch control signal comprising pulses, each pulse being associated with a parasitic pulse.

The foregoing objects, features and advantages of the present invention, will be discussed in detail in the following non-limiting description of specific embodiments in connection with the accompanying drawings.

BRIEF DESCRIPTION OF THE DRAWINGS

FIG. 1, previously described, shows a circuit for providing vertical and horizontal scan control signals of a TV set;

FIGS. 2 and 3, previously described, show signals characteristic of the circuit of FIG. 1;

FIG. 4, previously described, shows the curve of the variation of a horizontal synchronization signal comprising parasitic pulses;

DETAILED DESCRIPTION

The principle of the present invention comprises modifying signal PH so that for each parasitic pulse, comparator 22 provides a current pulse $I_{PLL}$, having a constant amplitude but the sign of which alternates so that control signal $S_C$ of oscillator 26 varies generally as little as possible.

Figure 5:
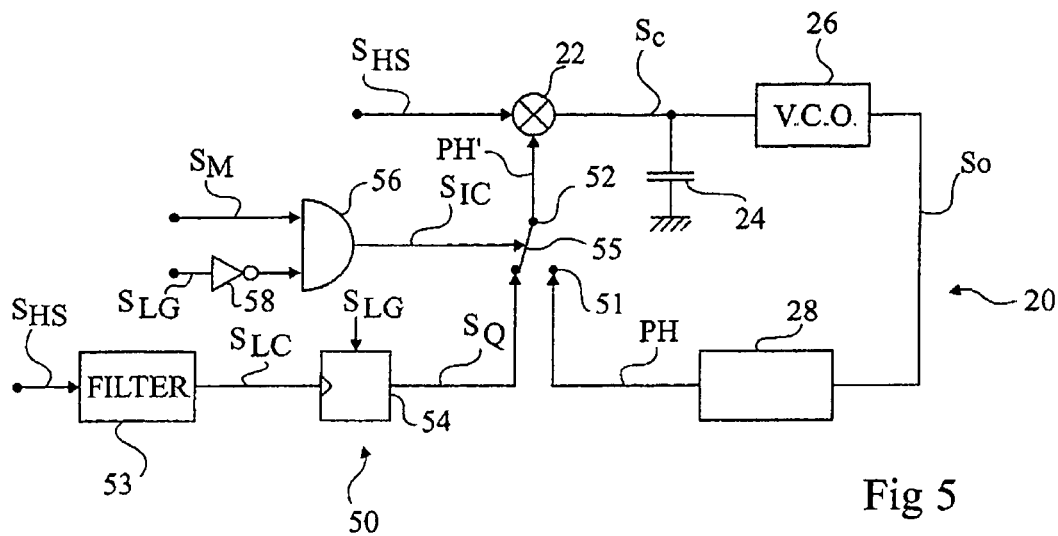
FIG. 5 schematically shows an example of embodiment of a correction circuit according to the present invention assembled on the phase-locked loop of FIG. 1.
Figure 6:
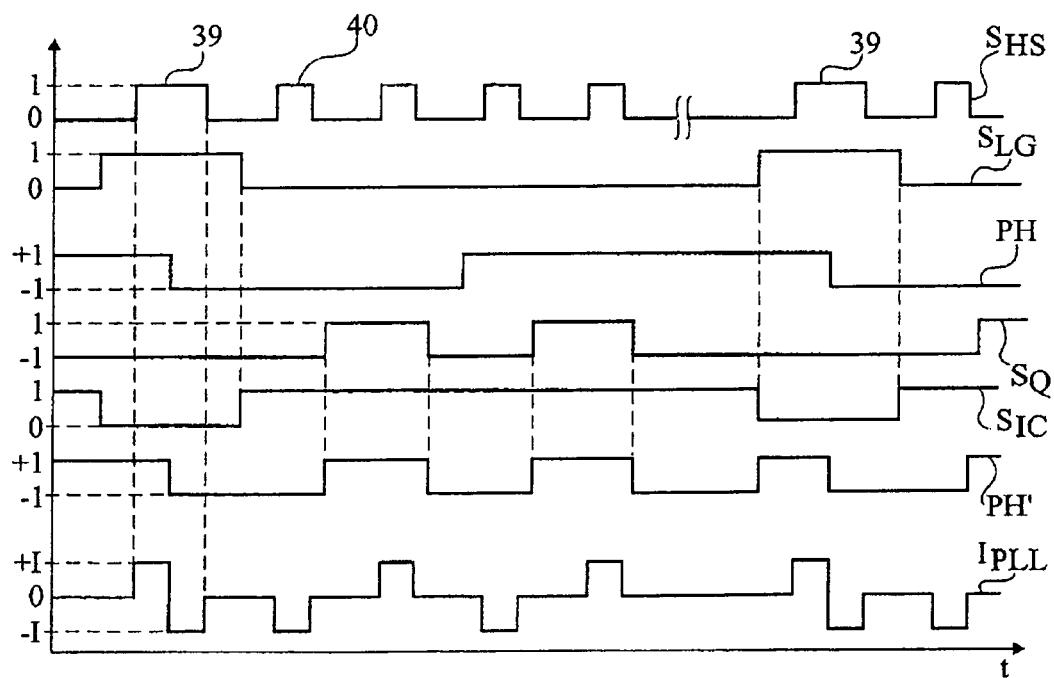
FIG. 6 shows signals characteristic of the correction circuit of FIG. 5.

FIGS. 5 and 6 respectively show an example of embodiment of a correction circuit according to the present invention assembled on the phase-locked loop of FIG. I and signals characteristic of circuit 50 in operation.

Correction circuit 50 according to the present invention is arranged between the output of frequency divider 28 and the input of phase comparator 22. Circuit 50 receives at an input 51 signal PH and provides to an output 52 a signal PH'. Circuit 50 comprises a filter 53 receiving as an input horizontal synchronization signal $S_{HS}$ and providing a rectangular latch control signal $S_{LC}$ comprising a series of pulses, each pulse corresponding to a parasitic pulse of signal $S_{HS}$. Latch control signal $S_{LC}$ is provided to a latch 54 generating a binary signal $S_Q$ equal to −1 or 1 and the frequency of which is equal to half the frequency of $S_{LC}$. Signal $S_Q$ thus switches state for each parasitic pulse 40.

Circuit 50 comprises a voltage-controlled switch 55 having a terminal connected to output 52 of circuit 50 and having its other terminal connected, according to a binary switch control signal $S_{JC}$, to input 51 or to the output of latch 54. More specifically, signal PH' is equal to signal PH when $S_{JC}$ is at 0 and to signal $S_Q$ when $S_{JC}$ is at 1. Switch control signal $S_{JC}$ is provided by a logic AND gate 56 receiving a binary validation signal of correction circuit $S_M$ and a binary line gating signal $S_{LG}$ inverted by an inverter 58. Line gating signal $S_{LG}$ is equal to 1 at the level of each horizontal synchronization pulse 39 of signal $S_{HS}$. Signal $S_M$, provided by signal provision unit 14, is equal to 1 over the entire duration for which signal $S_{HS}$ comprises parasitic pulses 40. Switch control signal $S_{IC}$ is thus at 1 when parasitic pulses 40 may be present and in the absence of a synchronization pulse 79. Logic gate 56 may receive additional validation pulses as will be described hereafter.

Signal $S_M$ being at 1, as long as signal $S_{LG}$ is at 1, phase-locked loop 20 remains controlled by the "real" horizontal synchronization pulses 39. When signal $S_{LG}$ is at 0, signal PH' is equal to $S_Q$ and switches state for each parasitic pulse 40. This results in issuing, between two synchronization pulses, a current $I_{PLL}$, the average of which remains practically zero, thus avoiding a drift in control voltage $S_C$ of oscillator 26. The method according to the present invention depends neither on the number, nor on the width, nor on the position of parasitic pulses 40.

Figure 7:
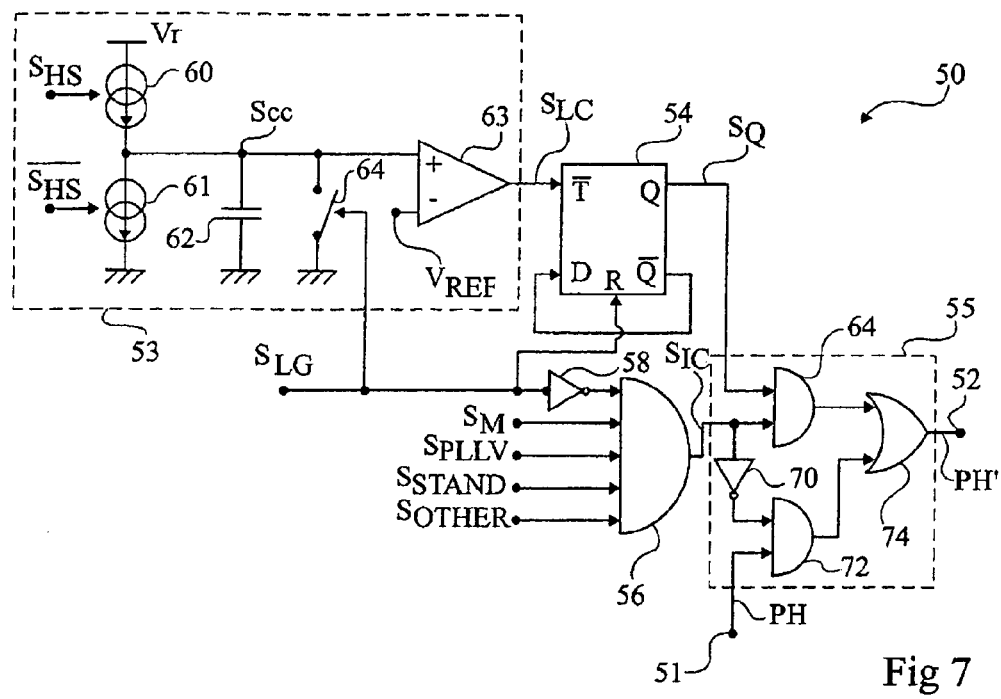
FIG. 7 shows in more detail the correction circuit of FIG. 5.
Figure 8:
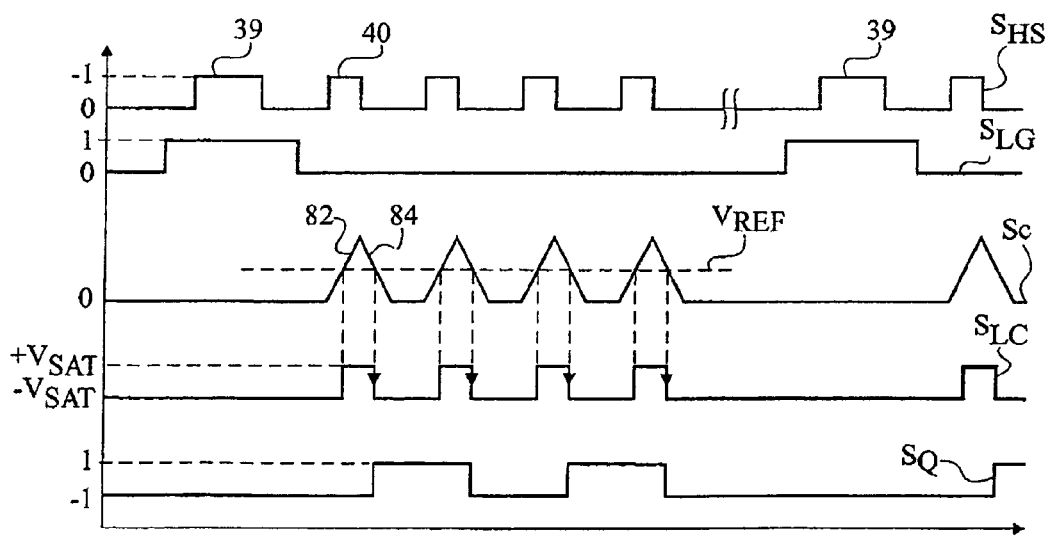
FIG. 8 shows signals characteristic of the correction circuit of FIG. 7.

FIGS. 7 and 8 respectively show a more detailed diagram of an example of embodiment of correction circuit 50 of FIG. 5 and signals characteristic of circuit 50 in operation.

Filter 53 of circuit 50 comprises two series connected current sources 60, 61 between a high voltage $V_R$ and the ground. Current source 60 is controlled by horizontal synchronization signal $S_{HS}$. Current source 61 is controlled by the inverse of signal $S_{HS}$, designated as $\overline{S}_{HS}$. The terminal common to sources 60, 61 is connected to a terminal of a capacitor 62, the other terminal of which is grounded. Voltage $S_{CC}$ across capacitor 62 is applied to the non-inverting input (+) of a voltage comparator 63. A switch 64 controlled by line gating signal $S_{LG}$ is assembled in parallel with capacitor 62. The inverting input (−) of comparator 63 receives a reference voltage $V_{REF}$.

Comparator 63 provides signal $S_{LC}$ transmitted to an input T of latch 54 assembled as a divider by two. The latch also comprises a Q output which provides signal $S_Q$ to switch 55, a reset input R receiving signal $S_{LG}$ and an output $\overline{Q}$ which provides the inverse of signal $S_Q$ to a D input. At each falling edge of signal $S_{LC}$, signal $S_Q$ switches to the value at input D and input D then switches to the inverse of signal $S_Q$.

Switch 55 comprises a logic gate 64 receiving signal $S_Q$ and signal $S_{IC}$ provided by logic gate 56. Signal $S_{IC}$ is also provided to the input of an inverter 70 having its output connected to an input of a logic AND gate 72. The other input of logic gate 72 receives signal PH. The outputs of logic gates 64 and 72 are connected to the input of a logic OR gate 74 which provides signal PH'.

In the present example of embodiment, logic gate 56 comprises at least four inputs. The first input receives signal $S_{LG}$ inverted by inverter 58. The second input receives signal $S_M$. The third input receives a phase-locked loop validation signal $S_{PLLV}$ which is at 1 when phase-locked loop 20 is synchronized in phase. The fourth input receives a standard validation signal $S_{STAND}$ which is at 1 when the composite video signal CVBS received by the TV set corresponds to a recognized television standard. In particular, signal $S_M$ is modulated in width according to the transmission standard, that is, according to signal $S_{STAND}$. Logic gate 56 may receive other signals $S_{OTHER}$ comprising, for example, validation signals of specific components of the TV set.

On normal operation of the TV set, and in the area of the composite video signal where parasitic pulses are present, signals $S_{STAND}$, $S_{PLLV}$, and $S_M$ are at 1. Signal $S_{IC}$ is then equal to the inverse of $S_{LG}$. When signal $S_{LG}$ is at 1, that is, at the level of a horizontal synchronization pulse 39, signal $S_{IC}$ is at 0 and signal PH' is equal to signal PH. When signal $S_{LG}$ is at 0, that is, on the portions of signal $S_{HS}$ where parasitic pulses 40 may be present, signal $S_{IC}$ is at 1 and signal PH' is equal to $S_Q$.

FIG. 8 shows the variation of signals characteristic of the circuit of FIG. 7, to illustrate the elaboration of signal $S_Q$, assuming that signals $S_{PLLV}$, $S_{STAND}$, and $S_M$ are at 1. When line gating signal $S_{LG}$ is at 1, switch 64 is on. Capacitor 62 is then short-circuited and if it comprises a residual charge, completely discharges. Latch 54 is reset, for example, to −1. When signal $S_{LG}$ switches to 0, switch 64 is off. Signal $S_{HS}$ being then generally at 0, current source 61 is active. However, the charge of capacitor 62 being zero, voltage $S_{CC}$ remains zero. At the rising edge of the first parasitic pulse 40, signal $S_{HS}$ switches to 1 and only current source 60 is activated. Capacitor 62 is then charged at constant current, voltage $S_{CC}$ following an ascending ramp 82. At the end of parasitic pulse 40, signal $S_{HS}$ switches to 0. Current source 61 is then activated. Capacitor 62 discharges at constant current and voltage $S_{CC}$ follows a descending ramp 84 to reach the zero voltage. The charge and discharge phases of capacitor 62 are repeated for each parasitic pulse 40.

Comparator 63 compares voltage $S_{CC}$ with reference voltage $V_{REF}$. The obtained voltage $S_{LC}$ thus is a rectangular voltage equal to $-V_{SAT}$, where $V_{SAT}$ is the saturation voltage of comparator 63, and which exhibits pulses at $+V_{SAT}$ for each charge and discharge cycle of capacitor 62.

At the first falling edge of voltage $S_{LC}$, voltage $S_Q$ switches from 0 to 1. At each successive falling edge of signal $S_{LC}$, signal $S_Q$ switches to the opposite state. Current $I_{PLL}$ thus exhibits pulses alternately at +I and −I. Voltage $S_C$ across capacitor 24 of phase-locked loop 20 increases and decreases according to the direction of current $I_{PLL}$ which runs through it and varies little on the whole. The frequency of signal $S_O$ provided by voltage-controlled oscillator 26 is thus little disturbed by parasitic pulses 40. In particular, in the case where the number of parasitic pulses 40 is even, the frequency of signal $S_O$ does not vary on the whole.

The present invention enables keeping a fast time constant for the phase-locked loop. In this case, when the parasitic pulses stop being present between two horizontal synchronization pulses, and before provision of the video signal, the phase-locked loop, in the case where signal $S_O$ would be slightly disturbed, can catch up on the phase and frequency of horizontal synchronization signal $S_{HS}$ before the beginning of the display of an image on screen.

Further, the correction circuit according to the present invention comprises few components and is easily integrable.

Of course, the present invention is likely to have various alterations, modifications, and improvements which will readily occur to those skilled in the art. In particular, voltage-controlled switch 55 may be formed in any known manner.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for providing a horizontal scan control signal for a TV set from a horizontal synchronization signal contained in a composite video signal, the horizontal synchronization signal containing horizontal synchronization pulses and parasitic pulses, said scan control signal being provided from an oscillating signal generated by an oscillator of a phase-locked loop receiving the horizontal synchronization signal, said oscillating signal having a frequency depending on a driving signal provided from the comparison between the horizontal synchronization signal and a binary phase signal, wherein, at each parasitic pulse among successive parasitic pulses between two synchronization pulses, the driving signal is alternately varied in the increasing direction and in the decreasing direction.

2. The method of claim 1, wherein the parasitic pulses have variable durations.

3. A circuit for providing a horizontal scan control signal for a TV set from a horizontal synchronization signal contained in the composite video signal, the horizontal synchronization signal containing horizontal synchronization pulses and parasitic pulses, said circuit comprising a phase-locked loop receiving the horizontal synchronization signal comprising an oscillator generating an oscillating signal from which is provided the scan control signal, the frequency of the oscillating signal depending on a driving signal provided from the horizontal synchronization signal, and comprising a means for correcting the driving signal which, at each parasitic pulse among successive parasitic pulses between two synchronization pulses, alternately varies the driving signal in the increasing and decreasing direction.

4. The circuit of claim 3, further comprising:
a comparator for comparing the horizontal synchronization signal and a modified phase signal and providing, according to the comparison, a current of zero amplitude or of constant amplitude and of variable sign;
a capacitor conducting the current and providing the driving signal; and
a correction circuit providing the comparator with the modified phase signal corresponding to a binary phase signal having a frequency proportional to the frequency of the oscillating signal or corresponding to a binary correction signal, the state of which switches for each parasitic pulse.

5. The circuit of claim 4, wherein the correction circuit comprises a switch adapted to alternately connecting, according to a switch control signal, an output terminal connected to the comparator at a first input terminal receiving the phase signal or at a second input terminal receiving the correction signal, the switch signal being provided from a binary signal at a first state at the level of a synchronization pulse and at a second state otherwise.

6. The circuit of claim 5, wherein the switch signal is also provided from at least one binary validation signal at a first state when a validation condition is fulfilled and at a second state when the validation condition is not fulfilled.

7. The circuit of claim 4, comprising a latch providing the correction signal receiving a binary latch control signal provided from the horizontal synchronization signal, the state of the correction signal switching at each falling edge of the latch control signal.

8. The circuit of claim 7, comprising a filter receiving the horizontal synchronization signal and providing the latch control signal, the latch control signal comprising pulses, each pulse being associated with a parasitic pulse.

9. A method of synchronizing an image signal with a synchronization signal that includes synchronization pulses, the method comprising:
receiving the synchronization signal;
providing a control signal to a phase-locked loop based on the synchronization signal;
determining a presence of parasitic pulses in the synchronization signal; and
in response to determining the presence of the parasitic pulses, adjusting the control signal such that an average of the control signal is approximately zero.

10. The method of claim 9, wherein the adjusting of the control signal comprises adjusting the control signal such that the control signal has a pulse of alternating polarity for each one of the parasitic pulses received.

11. The method of claim 9, wherein the providing of the control signal to the phase-locked loop based on the synchronization signal comprises:
comparing a phase-locked loop signal to the synchronization signal.

12. The method of claim 11, wherein the adjusting of the control signal comprises comparing the synchronization signal to a signal that changes polarity in response to each parasitic pulse received.

13. The method of claim 9, wherein the adjusting of the control signal comprises de-coupling the control signal from the phase-locked loop signal.

14. A circuit for synchronizing an image signal with a synchronization signal that includes synchronization pulses, the circuit comprising:
a phase-locked loop that receives a control signal; and
a correction circuit that adjusts the control signal to have an average value of approximately zero, in response to determining a presence of parasitic pulses in the synchronization signal.

15. The circuit of claim 14, further comprising:
a comparator that compares the synchronization signal with at least one other signal and provides the control signal to the phase-locked loop.

16. The circuit of claim 15, wherein the at least one other signal comprises a phase-locked loop signal.

17. The circuit of claim 15, wherein the at least one other signal comprises a signal that changes polarity in response to each parasitic pulse received.

18. The circuit of claim 17, wherein the correction circuit comprises:
a switch that couples the comparator, in response to determining a presence of the parasitic pulses, to the signal that changes polarity.

19. The circuit of claim 18, wherein the correction circuit further comprises:
a filter that receives the synchronization signal and removes the synchronization pulses therefrom, such that the filter provides a signal that includes only the parasitic pulses; and
a flip-flop that receives the signal that includes only the parasitic pulses, and provides to the comparator the signal that changes polarity.

20. The circuit of claim 19, wherein the circuit provides a horizontal scan control signal for a TV set and the phase-locked loop comprises an oscillator that produces a signal having a frequency that is based on a magnitude of the control signal.

* * * * *